United States Patent
Engström

(10) Patent No.: US 8,001,835 B2
(45) Date of Patent: Aug. 23, 2011

(54) METHOD AND DEVICE FOR DYNAMOMETER TESTING OF A MOTOR VEHICLE AND VEHICLE COMPONENTS

(76) Inventor: Christian Engström, Tyresö (SE)

( * ) Notice: Subject to any disclaimer, the term of this patent is extended or adjusted under 35 U.S.C. 154(b) by 0 days.

(21) Appl. No.: 12/227,283

(22) PCT Filed: May 16, 2007

(86) PCT No.: PCT/SE2007/000478
§ 371 (c)(1),
(2), (4) Date: Nov. 13, 2008

(87) PCT Pub. No.: WO2007/133154
PCT Pub. Date: Nov. 22, 2007

(65) Prior Publication Data
US 2009/0126510 A1 May 21, 2009

(30) Foreign Application Priority Data
May 16, 2006 (SE) .................................. 0601087

(51) Int. Cl.
G01M 17/00 (2006.01)
(52) U.S. Cl. .................................. 73/116.06; 73/116.05
(58) Field of Classification Search .............. 73/116.06, 73/116.05
See application file for complete search history.

(56) References Cited

U.S. PATENT DOCUMENTS

| 4,669,318 | A | | 6/1987 | Angstrom |
| 4,939,985 | A | | 7/1990 | Von Thun |
| 5,323,644 | A | * | 6/1994 | Schaefer ..................... 73/118.01 |
| 6,754,615 | B1 | | 6/2004 | Germann et al. |
| 7,104,118 | B2 | * | 9/2006 | Tentrup et al. ............. 73/116.06 |
| 7,117,730 | B2 | * | 10/2006 | Karrer et al. ..................... 73/123 |
| 7,367,229 | B2 | * | 5/2008 | Engstrom ....................... 73/168 |
| 7,530,263 | B2 | * | 5/2009 | Sowle ........................ 73/118.01 |
| 2004/0007046 | A1 | | 1/2004 | Karrer et al. |

FOREIGN PATENT DOCUMENTS

| WO | WO 85/04475 | 10/1985 |
| WO | WO 2004/111739 | 12/2004 |

OTHER PUBLICATIONS

International Search Report dated Aug. 8, 2007.

* cited by examiner

*Primary Examiner* — Freddie Kirkland, III
(74) *Attorney, Agent, or Firm* — Jacobson Holman PLLC

(57) ABSTRACT

A method and a device for dynamometer testing of a motor vehicle, having a front end and a rear end and a right side and a left side, as seen in a driving direction, and/or vehicle components, by measuring torque and rotational speed on drive shafts of the vehicle. A braking torque is applied to each one of the shafts by individual hydraulic dynamometer test units by throttling hydraulic fluid flows. The braking torque is adjustable for each individual one of the drive shafts such that a resulting individual rotational speed for that shaft corresponds to a virtual vehicle speed when driving the motor vehicle on a road, compensated with a slip value.

20 Claims, 3 Drawing Sheets

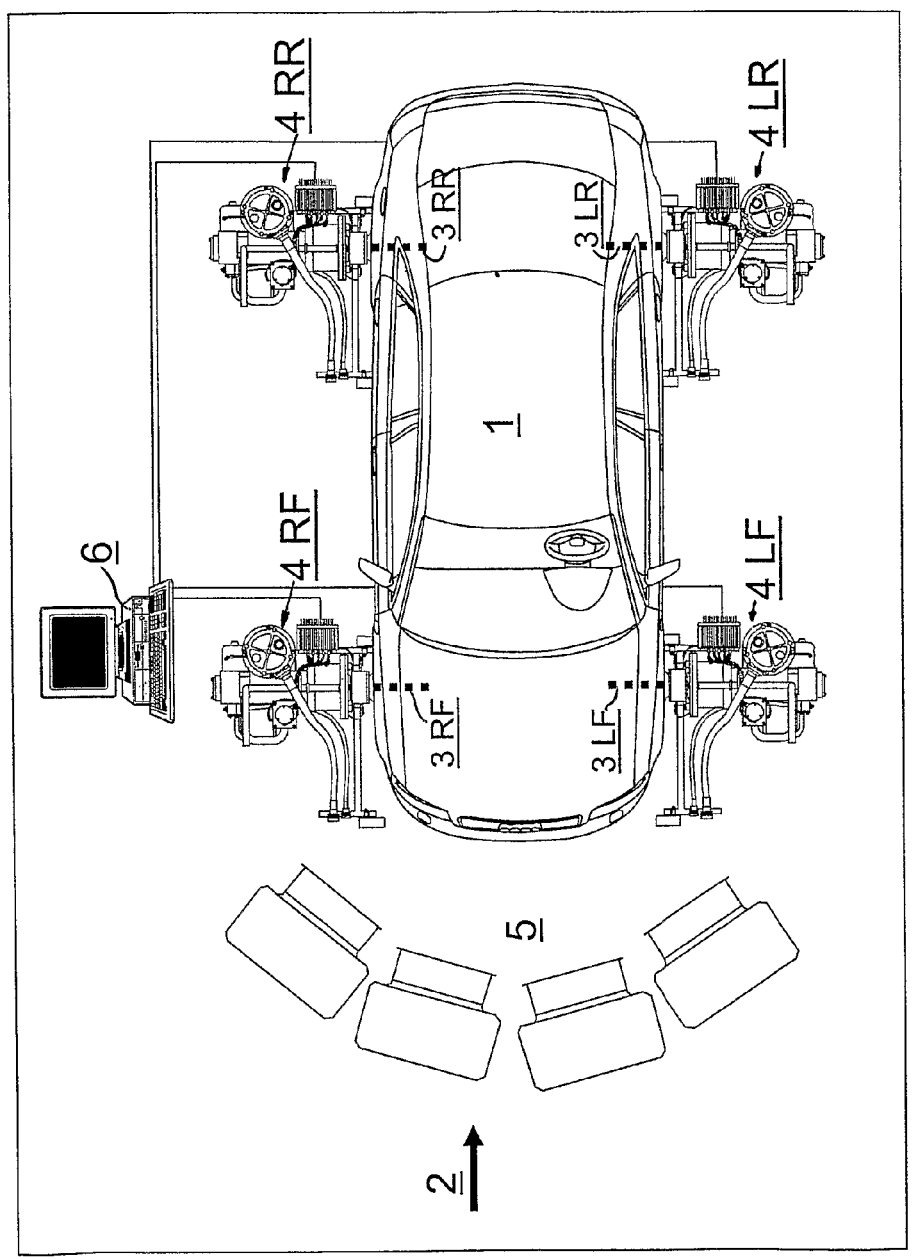
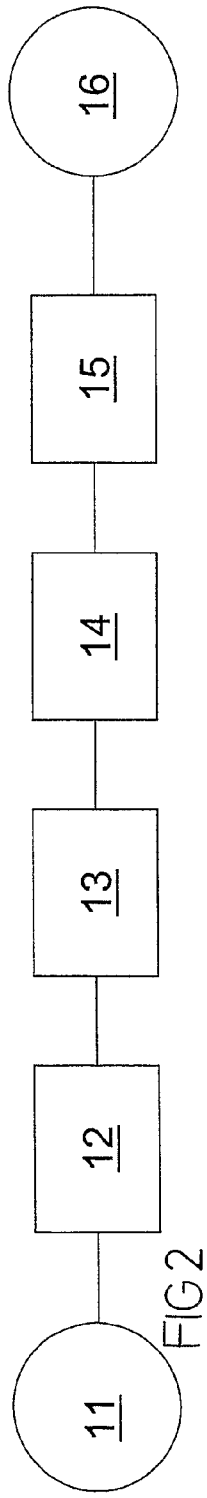

METHOD AND DEVICE FOR DYNAMOMETER TESTING OF A MOTOR VEHICLE AND VEHICLE COMPONENTS

This is a national stage of PCT/SE07/000478 filed May 16, 2007 and published in English, which has a priority of Sweden no. 0601087-0 filed May 16, 2006, hereby incorporated by reference.

FIELD OF THE INVENTION

This invention concerns a method and a device for dynamometer testing of a motor vehicle and vehicle components according to the respective preambles of claims 1 and 12.

BACKGROUND OF THE INVENTION

U.S. Pat. No. 4,669,318 (Ångström) concerns an apparatus for dynamometer testing of motor vehicles, wherein load absorbing means in the form of a hydrostatic pump assembly has an input shaft for engagement with a drive shaft of a vehicle to be tested. Sensor means are arranged so as to allow measuring the torque from the vehicle drive shaft. Typically, in a vehicle having two wheel drive, each drive shaft is connected to an individual apparatus of this kind, whereby a total effective torque from the vehicle can be accurately measured.

The apparatus according to the background art is reliable and accurately measures torque in a steady load situation.

Recently there have been demands for testing appliances that can more truly mimic a true vehicle driving situation taking into account the dynamic conditions prevailing during real life driving of the vehicle on a road.

Roller type dynamometers equipped with large rollers that support vehicle wheels are previously known, but this kind of appliances does, however, not allow full measurement freedom.

As representatives of the background art can also be mentioned U.S. Pat. No. 6,754,615 which discloses a method of simulating the performance of a vehicle on a roadway with the help of torque controlled electric load machines and U.S. Pat. No. 4,939,985 which discloses a test bench for testing the drive train of a vehicle using electric load machines. These two latter constructions are overly complex, require extensive electrical installation, require fixed installation sites and are not particularly flexible.

AIM AND MOST IMPORTANT FEATURES OF THE INVENTION

It is an aim of this invention to provide a method and a device that overcome the problems of the background art and provide an economic method and device for thoroughly testing all kinds of vehicles in various real life simulating situations.

These aims are obtained in respect of a method and a device as initially stated through the features of the characterizing portions of the independent claims.

Hereby it is possible to simulate driving a vehicle on a road whereby a slip value is used to control the torque applied to the respective shaft. The braking torque is set in such a way for each individual drive shaft that the resulting rotational speed for that drive shaft corresponds to rotational speed corresponding to virtual vehicle speed compensated with a slip value.

Basically, when a vehicle is driven on a road, it is each tire's action that will determine how the torque is distributed between the wheels and between each of the wheels and the road. The performance of the vehicle is thus entirely dependent on the tire-road interface. Effective traction force for each wheel can be calculated from known and measured variables: torque, normal force, and set variable: slip/adhesion.

Because of the characteristics of a tire, the peripheral speed of the tire is different from the relative speed of the substrate (the road), when a torque is applied to the wheel. The slip-value is defined as relative speed difference between tire and substrate.

The slip value is dependent on several different parameters such as type of tire, road paving, weather conditions, applied torque to the drive shaft, acceleration or deceleration of the vehicle, driving uphill or downhill or on a straight plane, tire wear and normal force prevailing on the individual shaft carrying the tire in question. Only as an example, the rotational speed for a tire on a drive shaft is 1-2% higher because of slip (than an imagined situation without slip) driving with an ordinary passenger car at 100 km/hour.

Torque and rotational speed can be measured in different ways, e.g. directly and also indirectly by measuring: oil pressure in hydraulic dynamometer test unit for correlating to torque, measuring delivered torque and power output and measuring motor rotation speed.

By using rotational speed as well as torque as input data for the calculation of braking torque or load to be applied, high flexibility can be achieved. This is possible by letting the road parameters adapt to the accessible torque instead of having a certain rotational speed dictating a determined torque.

By this way allowing distribution of accessible torque from the vehicle the invention is not limited to merely simulating the road, but can also be used for engine-specific measurements with maintained accurate torque distribution between the wheels (shafts).

As a result, greater freedom of use compared to the background art is possible through the invention. It could be said that this way the invention allows different working modes, at least one with rotation speed and one with (accessible) torque controlled operation.

There are several advantages with the inventive concept of having individual hydraulic dynamometer test units performing the braking action on the drive shafts. One advantage is that there is a minimal need for external energy supply.

Devices according to the invention can be made portable for use in sites where fixed installations cannot be practically made. The compact construction with high energy absorption ability in relation to size saves space in comparison to electrically driven machines.

The invention makes it possible to thoroughly test a motor vehicle in numerous virtual driving situations.

When, in particular, each one of said hydraulic dynamometer test units includes a hydraulic pump unit which generates said hydraulic fluid flow during operation a practically advantageous solution is provided. This advantage is enhanced when an individually adjustable fluid valve throttles fluid flow from each pump unit.

It is also possible, according to an embodiment, to balance torques on right and left drive shafts of a vehicle with a two-wheel drive and also to simulate situations where driving parameters differ between the left drive shaft and the right drive shaft as for example simulating differently worn tires, different friction on left and right side of paving, different normal force acting on the different shafts, driving through a more or less sharp turn etc.

In one embodiment the method is used to apply balancing torques on also front and rear drive shafts of a vehicle with four-wheel drive. Thorough accurate testing of such vehicles has not been possible with solutions according to the background art. The invention makes it possible to control the torque in the same manner as is discussed above for right and left drive shafts also on front and rear drive shafts.

This makes it possible to safely adapt the system to vehicles representing different four-wheel drive systems, wherein torque distribution within the vehicle can vary extensively between the different systems. In one example, drive torque is distributed 50%-50% to the front and rear shafts, whereas in other systems there might be a drive torque distribution of as an example 30%-70% between front and rear and be re-adjustable up to 70%-30% between front and rear.

Also other distribution keys exist, from systems allowing distribution with 100% drive torque to only one of the front shafts and rear shafts and also distribution 60%-40%, re-adjustable to 40%-60%.

In this connection it should be noted that erroneous torque application of the testing system might seriously damage the transmission system of the vehicle, because if applied torque differs too much from what is intended by the vehicle manufacturer, too much torque has to be re-directed inside the vehicle transmission, for example over a viscous coupling, which in serious cases can result in complete failure of the system.

It is preferred that the compensating slip value is retrieved from a tire-slip model or a "tire model" (such as Pacejka, Böhm or HSRI), which describes slip values for different drive parameters (see above).

Preferably the torque applied to an individual shaft is limited depending on vehicle driving parameters so as to avoid overload of the components of the vehicle.

In particular it is preferred that the relationship between torques applied to front drive shafts and torques applied to rear drive shafts is limited within a predetermined range, which can be specified by the vehicle manufacturer.

The invention also concerns a device for dynamometer testing of a motor vehicle and/or vehicle components, wherein advantages corresponding to the above are achieved.

BRIEF DESCRIPTION OF DRAWINGS

The invention will now be described in greater detail with reference to the drawings, wherein:

FIG. 1 shows an overview over a system employing the invention in the process of dynamometer testing a vehicle, FIG. 2 shows a sequence over a method according to the invention.

DESCRIPTION OF EMBODIMENTS

Figure 3:
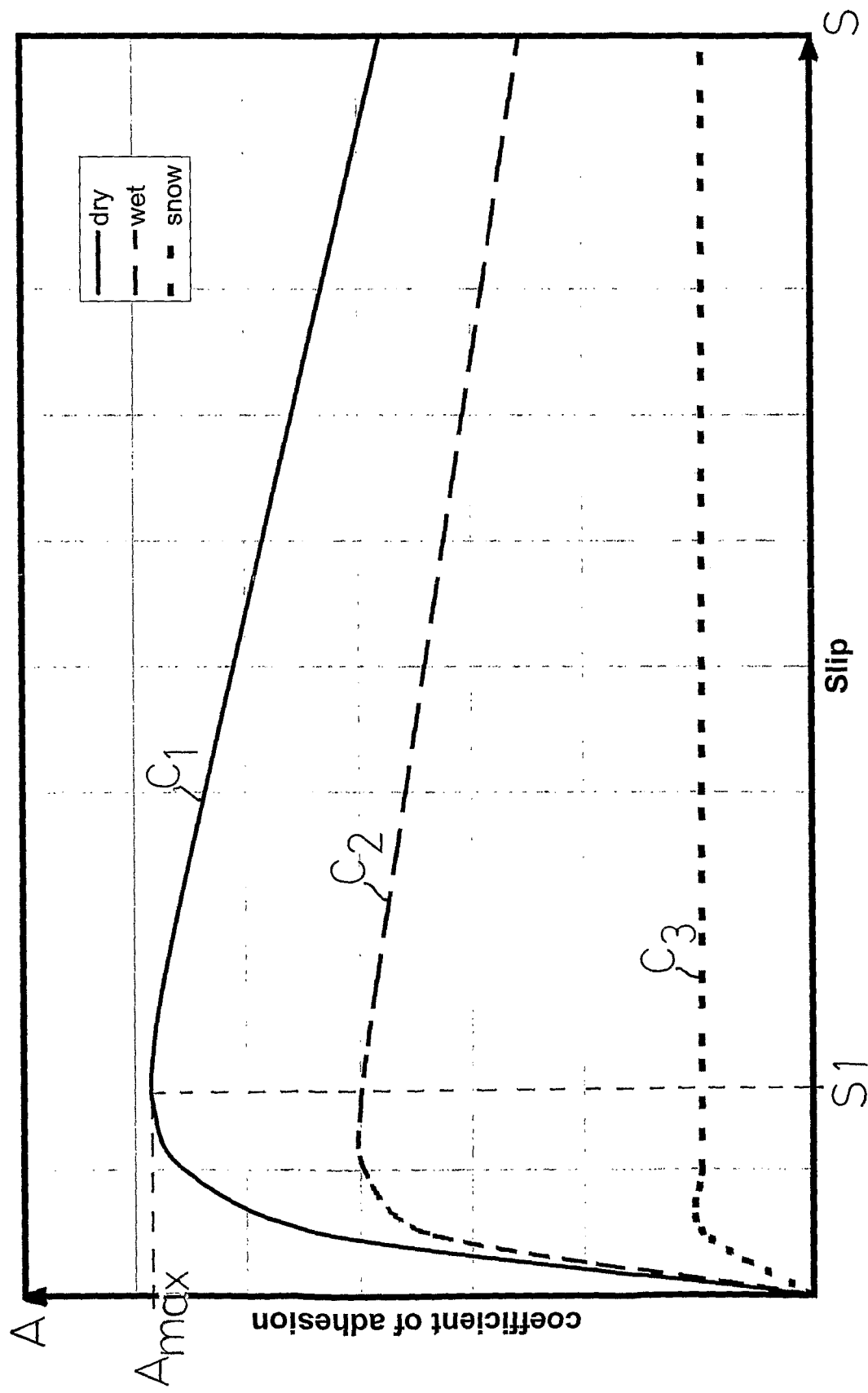
FIG. 3 shows a diagram over adhesion between a tire and a substrate as a function of the slip value.

In FIG. 1, a vehicle 1 is in the process of being tested with a device according to the invention, generally indicated with 2.

Four dynamometer test units $4_{LF}$, $4_{RF}$, $4_{LR}$ and $4_{RR}$ are directly connected to four drive shafts of the vehicle 1 which is a four-wheel drive vehicle. The shafts are indicated with $3_{LF}$, $3_{RF}$, $3_{LR}$ and $3_{RR}$. LF=left front, RF=right front, LR=left rear and RR=right rear.

Each test unit $4_{LF}$, $4_{RF}$, $4_{LR}$ and $4_{RR}$ includes a torque sensor (according to the background art) in order to obtain torque values during operation of the system. A rotational speed sensor (not shown) is also provided for each drive shaft.

A cooling unit 5 including a number of fans, serves to cool hydraulic fluid that has been heated because of throttling the flow during braking, by applying braking torque over the individual test units $4_{LF}$, $4_{RF}$, $4_{LR}$ and $4_{RR}$. The cooling unit 5 can also be connected so as to produce a simulated air stream corresponding to the relative air movement when driving the vehicle on a road.

A control unit 6 serves for controlling action of the dynamometer test units and to provide tire models for simulating true driving of the vehicle.

Reference is made to WO2004/111739 (Engstroem) which discloses a regulating device for control of flow and/or pressure. Such regulating devices in the form of valves are advantageously used as throttling devices for throttling the fluid flow in respect of the present invention since it allows accurate and fast adjustment and response to setting with the requirement of small forces for achieving the adjustments.

The regulating device described in that document includes a housing having an axis and a circumferential extension. It is provided with an inlet and an outlet and encloses an inner member which is arranged movably relative to the housing. The inner member is provided with a passage corresponding to the inlet for control of liquid flow and/or pressure.

The inlet comprises at least one group of at least two substantially radial ports which are spaced apart with a circumferentially equal distance. The passage comprises substantially radial apertures positioned correspondingly with respect to the ports, whereby the inner member is relieved from radial forces in operation. This is because the force distribution over the circumferential extension of the inner member will be equalised in operation of the device so that there will be no force resultant acting on the inner member.

Further, the inner member is fitted with a minor radial play inside the housing so that in operation a minor leakage of the liquid to be regulated will enter the very thin slit between the inner member and the housing so that these elements are in a floating relationship with each other. The radial play need not be noticeable and, as an example, the radial play could be of a magnitude of about $3/100$-$20/100$ mm.

The separation of the ports and the apertures with a circumferentially equal distance together with the mutual floating relationship of the two components, result in the great advantage that since the inner member becomes relieved in operation, the force needed to displace it relative to the housing, in order to achieve regulation of the liquid flow, is very small and thus enables fast and effortless movement of the inner member, which in turn enables rapid control.

Variations are possible in respect of e.g. it being possible to have a plural more or less independent groups of ports, provided that within each group the ports are distributed equally such that relief of resultant forces is obtained. For example a first group may have two ports spaced apart by 180°, i.e. diagonally. A second group may have two other ports that are spaced apart by 180°, i.e. diagonally.

It is, however most preferred that these surfaces have circular cross-section since this configuration has the advantage that in particular a rotation, but also an axial movement may be used to control the liquid flow. Possibly both a rotational and an axial movement can be performed during the actuation of the inner member.

A rotational movement has the advantage that the operation of the device may be altered from zero flow to full flow or vice versa solely by a rotation of the inner member of less that one revolution. It is also possible to use a simple but accurate rotational actuator for providing the inner member with a rotational movement with respect to the housing.

According to the inventive method and device, true driving on a substrate such as a road is simulated by applying a torque on each drive shaft of such a magnitude that the resulting rotational speed for each drive shaft takes account of slip-value at various driving parameters (see above), for example normal force, applied torque, type of tire, weather conditions and so on, given a certain simulated vehicle speed.

According to the invention, the resulting rotational speed for each drive shaft will be equal to the rotational speed that would result from true driving of the vehicle on a substrate such as a road.

The invention makes it possible to simulate various conditions and driving situations in order to thoroughly test the vehicle, and for that matter of course also vehicle components, such as motors and transmissions. As an example, losses in power train can be analysed.

For example, different transmissions can be tested for evaluating performance under different conditions such as slippery roads, worn tires, load variations etc.

An inventive method is briefly described referring to FIG. 2, wherein:

Position 11 indicates start of the session and start-up of a vehicle to be dynamometer tested.

Position 12 indicates setting a target vehicle speed.

Position 13 indicates applying a torque on each drive shaft and measuring resulting rotational speed for each shaft.

Position 14 indicates retrieving a tire model from a memory.

Position 15 indicates adjusting the braking torque on each drive shaft so that the resulting rotational speed corresponds to the target vehicle speed compensated with a slip value retrieved from the tire model.

Position 16 indicates end of sequence.

The sequence can subsequently be repeated very fast under fast altered conditions so as to simulate dynamic situations.

The method can be modified in the sense that no target speed has to be set. Instead, "vehicle speed" can be calculated from other variables. It is also possible to distribute a given accessible torque from the vehicle to the drive shafts by adequate brake torque management individually on the respective hydraulic dynamometer test units. The resulting virtual vehicle speed can thereafter be measured or calculated.

True normal force can be sensed, or normal force be simulated. It is also possible to simulate variations in normal force acting on individual shafts in order to e.g. simulate acceleration, deceleration, vehicle turns, aerodynamic lift, aerodynamic downforce etc. Thus with respect to the setting of slip, such variations can be provided so as to simulate a dynamic driving situation.

Also other variations are within the scope of the invention.

In FIG. 3 a tire model is illustrated as A, coefficient of adhesion as a function of S, slip value. Different curves, C1, C2, C3 correspond to different parameters such as different substrate friction due to wet-dry-snowy road, types of tires, speed, type of vehicle etc. $A_{max}$ varies greatly. Can as an example be ~1.2 for a standard tire and ~3 for a prepared racing tire.

From the tire model can be retrieved an instantaneous slip-value corresponding to the prevailing conditions regarding driving parameters.

Figure 4:
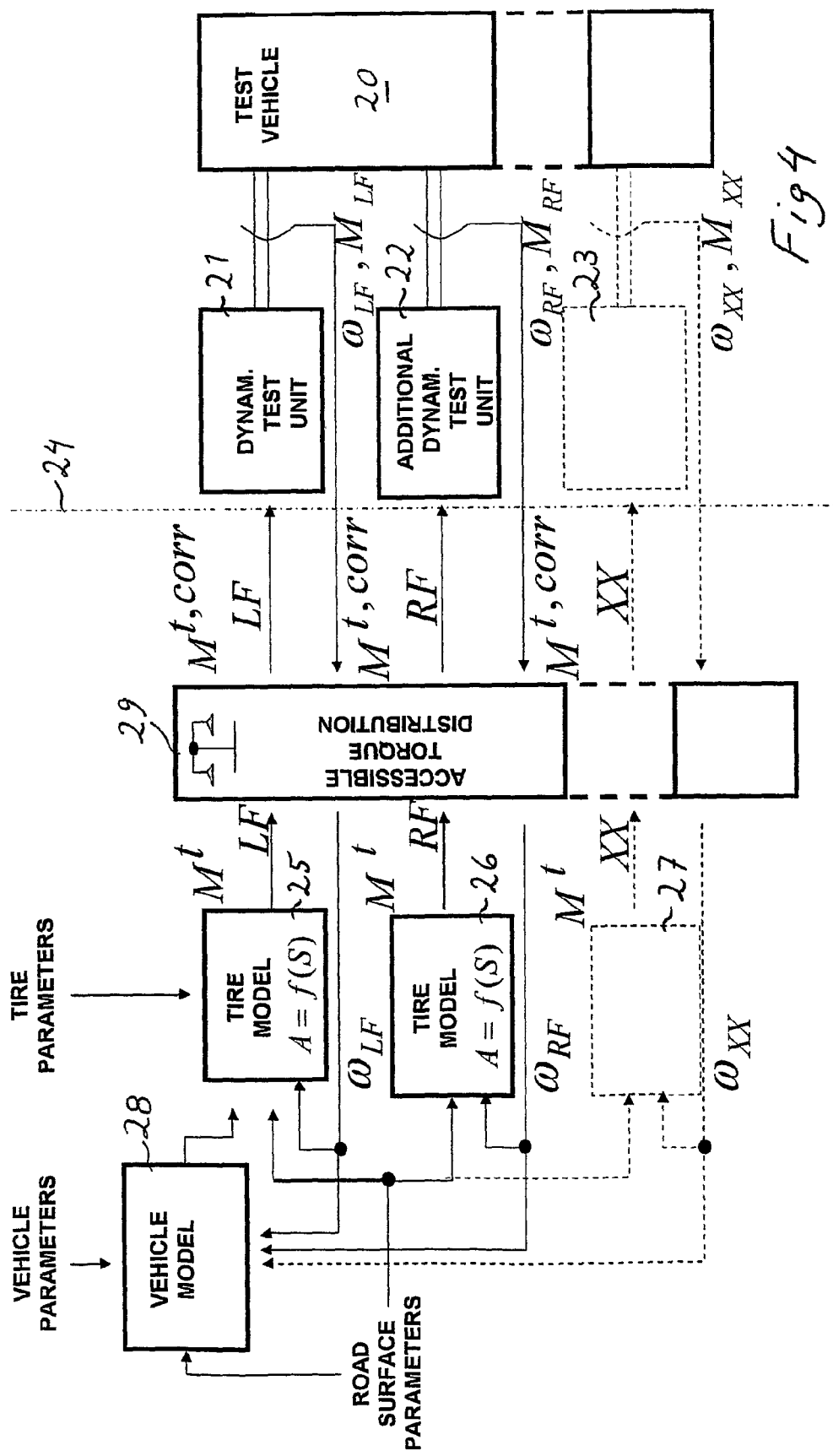
FIG. 4 shows a block diagram of a system employing the invention.

In the system of FIG. 4, a vehicle to be tested is indicated with 20. A number of hydraulic dynamometer test units 21, 22, 23 are directly coupled to respective drive shafts of the vehicle 20 (i.e. not connected over e.g. rollers). These items are defined as physical entities, to the right of a pointed line 24 in FIG. 4, whereas items to the left of that line 24 are characterized as functional entities which are realized as e.g. software.

Tire models are indicated with 25, 26 and 27. Different or identical tire models can be used in respect of one and the same test situation. A vehicle model is indicated at 28. Vehicle parameters such as normal forces, steering angles, side forces etc. can be input into the vehicle model for simulating of different driving situations, as can road surface parameters. The latter can also be input to the tire models.

The block "Accessible torque distribution" 29 regulates by balancing, limiting and modifying of accessible torque from the vehicle how the test units are to be set outgoing from data received on the one hand from the test units: Rotational speed: $\omega_{LF}, \omega_{RF}, \omega_{XX}, \ldots$, Torque: $M_{LF}, M_{RF}, M_{XX}, \ldots$, On the other hand from the tire models: Torque: $M^t_{LF}, M^t_{RF}, M^t_{XX}, \ldots$. Block 29 makes it possible to adjust the signals from the tire models such that the torques on the different drive shafts are distributed at will and in particular so as to allow tests to be performed in simulated situations that would otherwise not be possible. In particular also, the distribution will be made taking account on vehicle specific properties and limitation, as is discussed above. The dynamometer test is thereby supplied with adjusted torque values: $M^{t,corr}_{LF}, M^{t,corr}_{RF}, M^{t,corr}_{XX}, \ldots$.

The invention can be applied for positive as well as negative slip, i.e. also when a negative torque is applied to the tire on the shaft, such as when simulating the driver braking the vehicle so as to reduce its speed. In that case a rotational power is applied to the shaft from an external power source. This could be accomplished for example by modifying the test units 4 in FIG. 1 such that they are convertible to also operate as rotational motors. Also other motor solutions are within the scope of this idea.

The invention has made it possible to exploit the advantages of relatively simple hydraulic dynamometer test units for complicated testing situation, whereby high precision can be expected, also during dynamic situations.

The absorbed energy is easily released and the rotational masses are possible to make almost negligible for thereby maximizing the available dynamics of the method and device according to the invention.

The invention claimed is:

1. A method for dynamometer testing of a motor vehicle, the motor vehicle having a front end and a rear end and a right side and a left side, as seen in a driving direction, and/or vehicle components, by measuring torque and rotational speed on drive shafts of the motor vehicle, said method comprising the steps of applying a braking torque to each one of said drive shafts by individual hydraulic dynamometer test units by throttling hydraulic fluid flows, and said braking torque being adjustable for each individual one of said drive shafts such that a resulting individual rotational speed for that shaft corresponds to a virtual vehicle speed when driving the motor vehicle on a road, compensated with a slip value with said virtual vehicle speed being equal for all drive shafts, and retrieving the compensating slip-value from a tire model.

2. The method according to claim 1, wherein each one of said hydraulic dynamometer test units includes a hydraulic pump unit which generates said hydraulic fluid flow during operation.

3. The method according to claim 2, wherein an individually adjustable fluid valve throttles fluid flow from each pump unit.

4. The method according to claim 1, wherein balancing controlled braking torques are applied on all right and left drive shafts of the motor vehicle.

5. The method according to claim 1, wherein balancing controlled braking torques are applied on all shafts including front and rear shafts of a motor vehicle having at least four-wheel drive.

6. The method according to claim 1, wherein the braking torque applied to an individual drive shaft is limited to a value depending on vehicle driving parameters.

7. The method according to claim 1, when the motor vehicle has at least a four-wheel drive, wherein the relationship between torques applied to front shafts and torques applied to rear shafts is limited to be within predetermined ranges.

8. The method according to claim 1, wherein normal force acting on each one of said drive shafts is detected and/or simulated.

9. The method according to claim 1, wherein the drive shafts of the vehicle are subjected to an external rotational power.

10. The method according to claim 1, wherein distribution of accessible torque from the motor vehicle between the drive shafts is regulated so as to allow vehicle component testing during different simulated driving situations.

11. A device for dynamometer testing of a motor vehicle, the motor vehicle having a front end and a rear end and a right side and a left side, as seen in a driving direction, and/or vehicle components, said device comprising means for measuring torque and rotational speed on drive shafts of the vehicle, including individual hydraulic dynamometer test units for connection to the drive shafts for applying an adjustable braking torque to each individual one of said drive shafts by throttling hydraulic fluid flows, such that a resulting individual rotational speed for that shaft corresponds to a virtual vehicle speed when driving the motor vehicle on a road, compensated with a slip value with said virtual vehicle speed being equal for all drive shafts, the compensating slip-value being retrieved from a tire model.

12. The device according to claim 11, wherein each one of said hydraulic dynamometer test units includes a hydraulic pump unit which generates said hydraulic fluid flow during operation.

13. The device according to claim 12, wherein an individually adjustable fluid valve is arranged to throttle fluid flow from each pump unit.

14. The device according to claim 11, wherein the hydraulic dynamometer test units are arranged to apply balancing controlled braking torques are on all right and left drive shafts of the motor vehicle.

15. The device according to claim 11, wherein the hydraulic dynamometer test units are arranged to apply balancing controlled braking torques on all shafts including front and rear drive shafts of a motor vehicle having at least four-wheel drive.

16. The device according to claim 11, further comprising means for limiting the braking torque applied to an individual shaft to a value depending on vehicle driving parameters.

17. The device according to claim 11, further comprising a motor vehicle having at least a four-wheel drive, including means for limiting the relationship between torques applied to front shafts and torques applied to rear shafts to be within predetermined ranges.

18. The device according to claim 11, further comprising means for detecting and/or simulating normal force acting on each one of said drive shafts.

19. The device according to claim 11, further comprising means for subjecting the drive shafts of the motor vehicle to an external rotational power.

20. The device according to claim 11, further comprising means for regulating the distribution of accessible torque from the motor vehicle between the drive shafts so as to allow vehicle component testing during different simulated driving situations.

* * * * *